No. 728,446. PATENTED MAY 19, 1903.
W. C. DAY.
ADVERTISING APPARATUS.
APPLICATION FILED JAN. 14, 1903.
NO MODEL. 5 SHEETS—SHEET 1.

Witnesses: Inventor:
W. C. Day

No. 728,446. PATENTED MAY 19, 1903.
W. C. DAY.
ADVERTISING APPARATUS.
APPLICATION FILED JAN. 14, 1903.
NO MODEL. 5 SHEETS—SHEET 2.
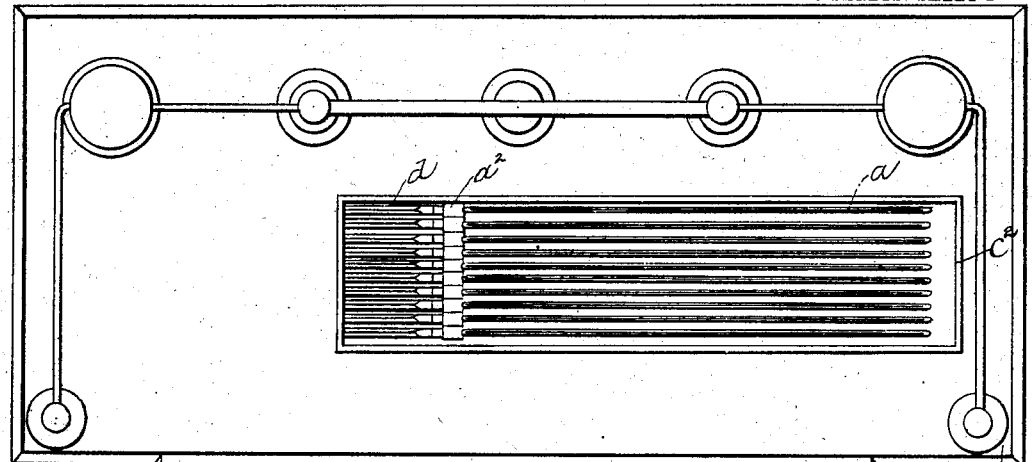
Fig. 2.
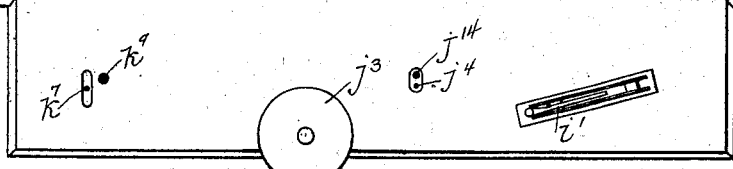
Fig. 3.
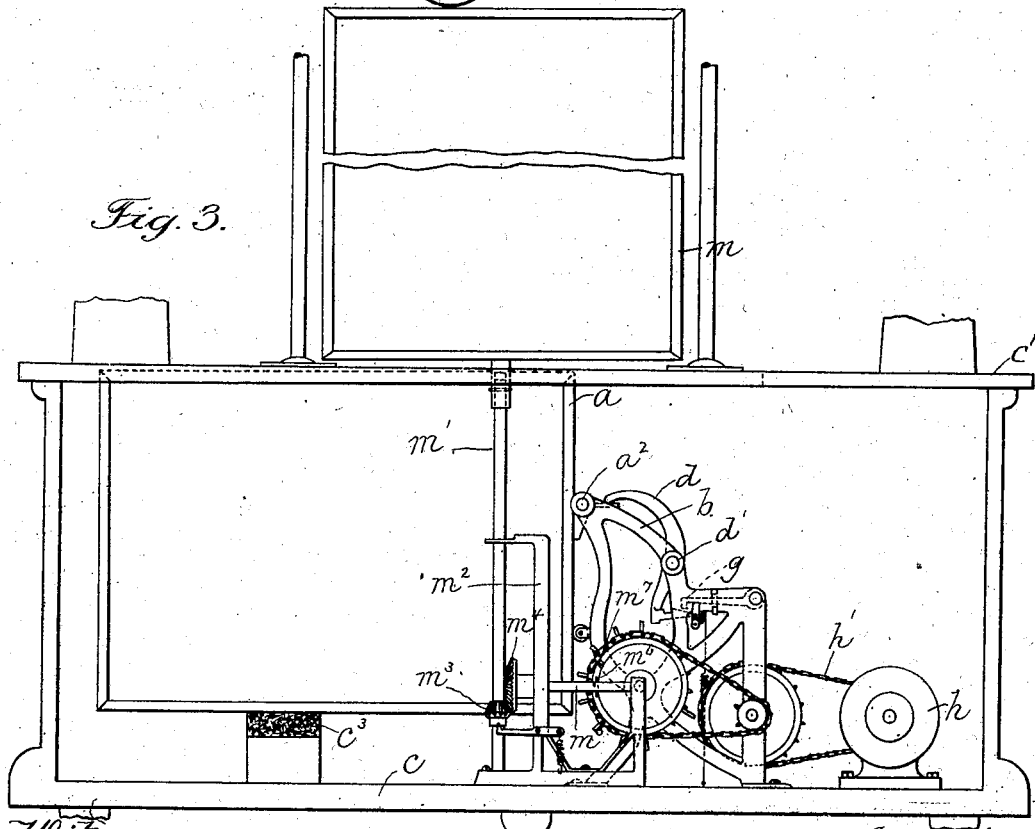
Witnesses:
Inventor:

No. 728,446. PATENTED MAY 19, 1903.
W. C. DAY.
ADVERTISING APPARATUS.
APPLICATION FILED JAN. 14, 1903.
NO MODEL. 5 SHEETS—SHEET 5.

Witnesses:
Adeline C. Ratigan
E. Batchelder

Inventor:
W. C. Day
by Hught Bown & Quinby
Attys.

No. 728,446. Patented May 19, 1903.

UNITED STATES PATENT OFFICE.

WILLIAM C. DAY, OF RUMFORD FALLS, MAINE, ASSIGNOR OF TWO-THIRDS TO JOHN L. HOWARD AND CHARLES B. RICHARDS, OF MEXICO, MAINE.

ADVERTISING APPARATUS.

SPECIFICATION forming part of Letters Patent No. 728,446, dated May 19, 1903.

Application filed January 14, 1903. Serial No. 138,956. (No model.)

*To all whom it may concern:*

Be it known that I, WILLIAM C. DAY, of Rumford Falls, in the county of Oxford and State of Maine, have invented certain new and useful Improvements in Advertising Apparatus, of which the following is a specification.

This invention has for its object to provide a simple and attractive advertising apparatus adapted to successively display any desired number of advertising cards or signs and to attract attention to the same.

The invention consists in the improvements which I will now proceed to describe and claim.

Figure 1:
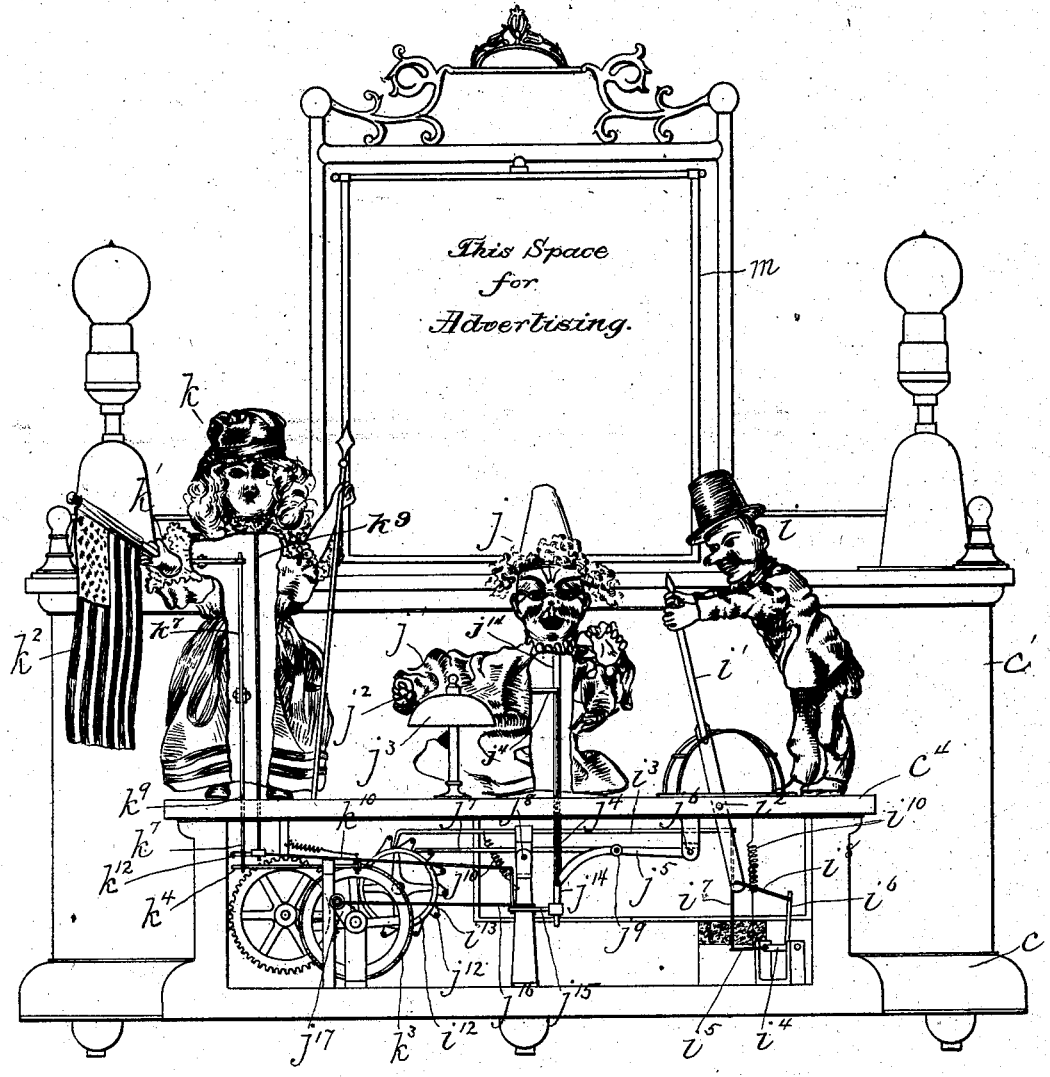
Figure 4:
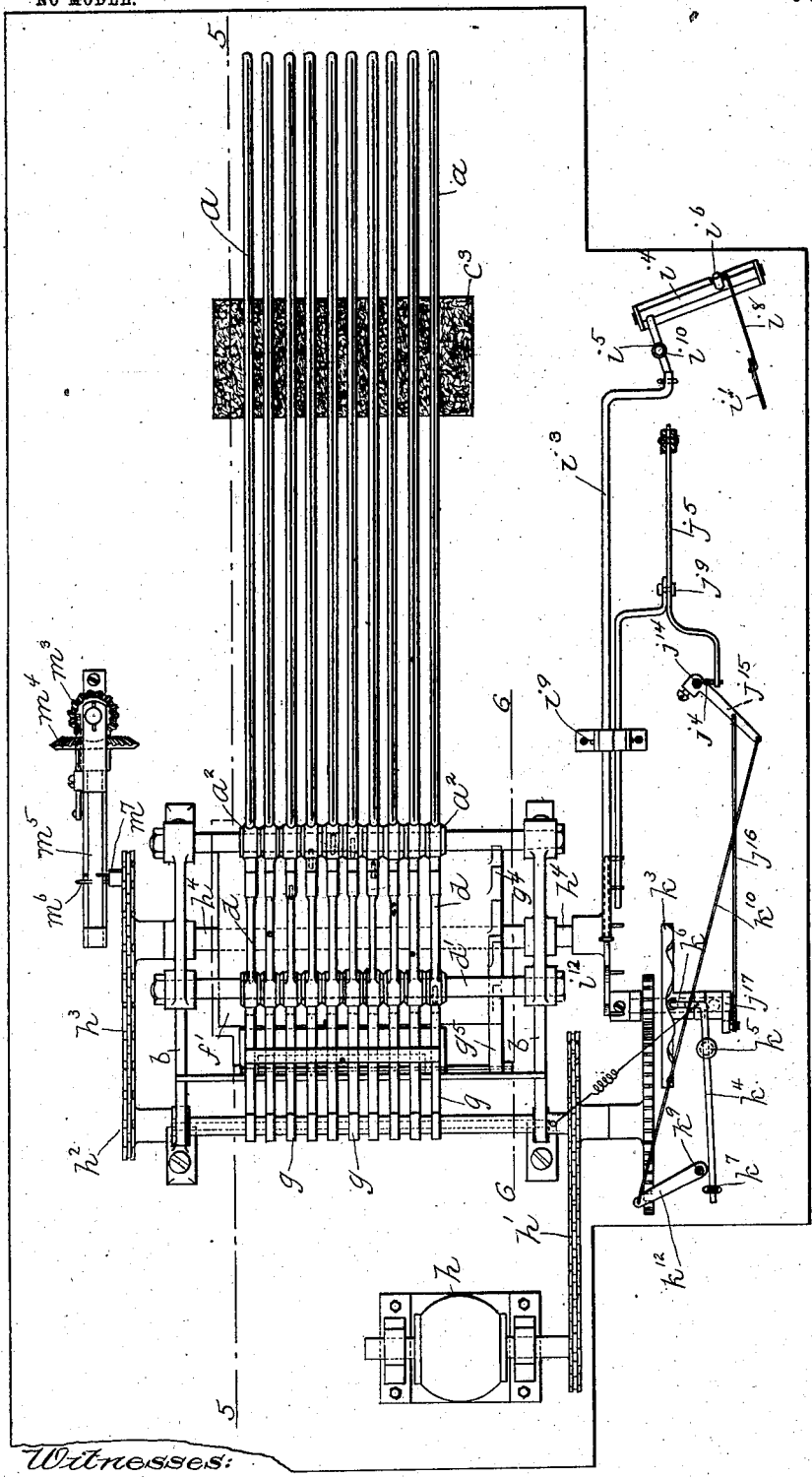
Figure 5:
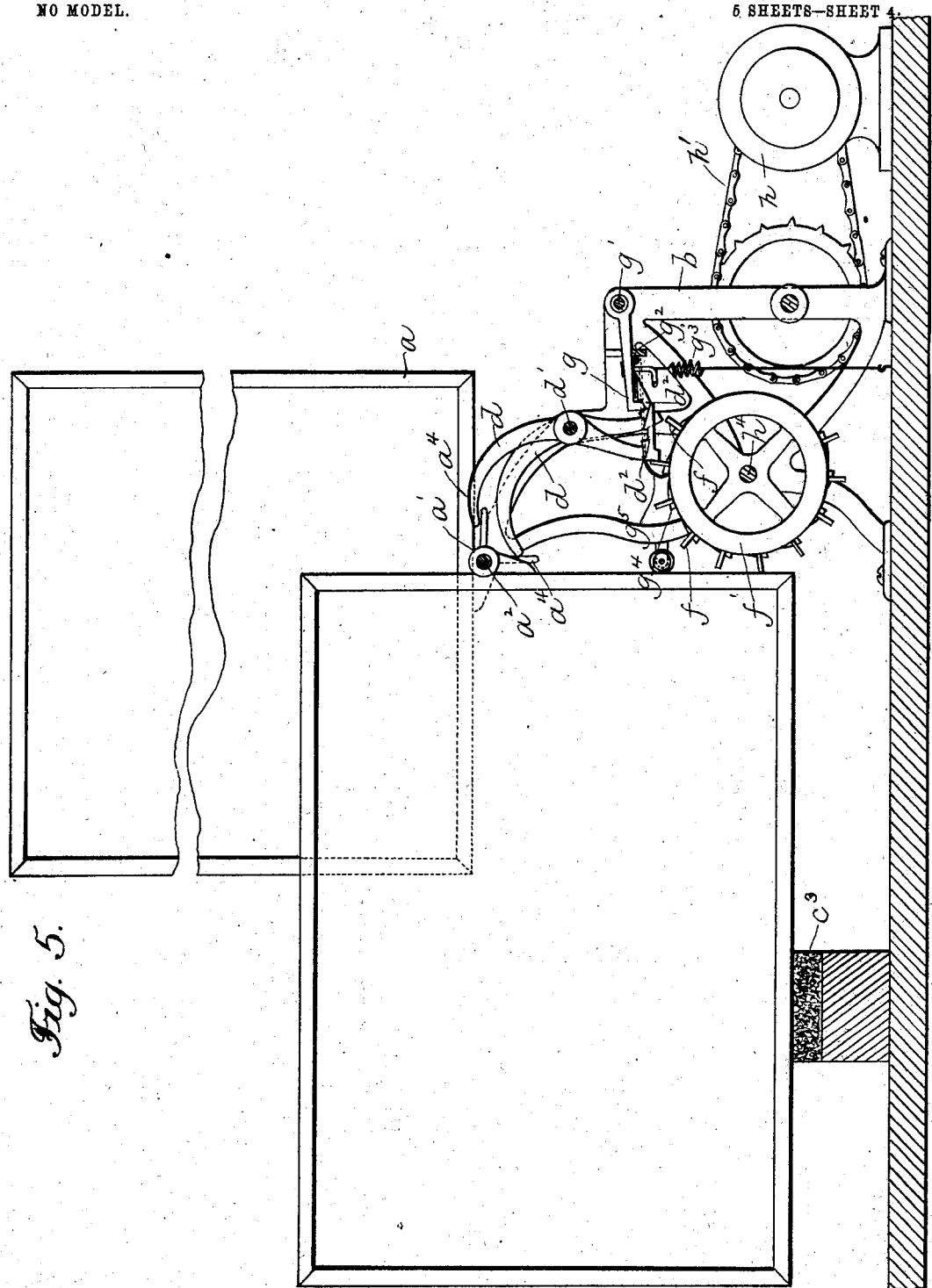
Figure 6:
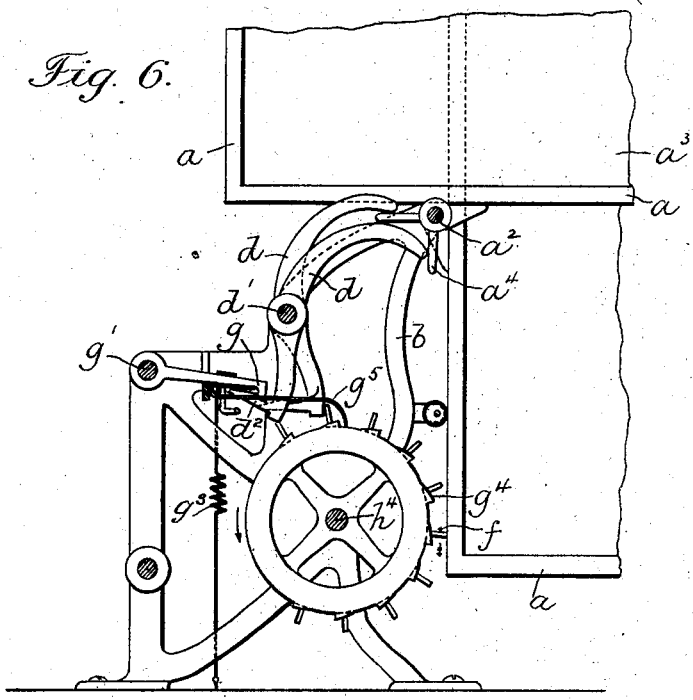
Figure 9:
Figure 7:
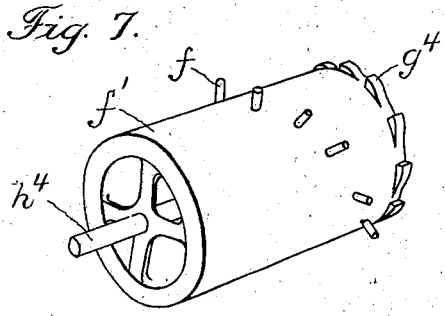
Figure 8:
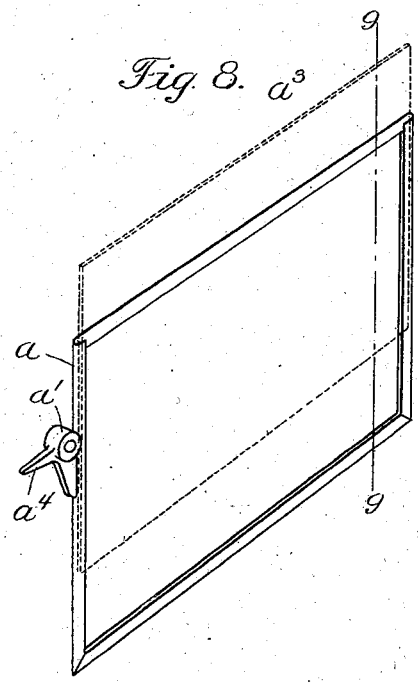

Of the accompanying drawings, forming a part of this specification, Figure 1 represents a front elevation of an advertising apparatus embodying my invention, a part of the casing being removed to show the operating mechanism. Fig. 2 represents a top view of the apparatus. Fig. 3 represents a rear elevation, the casing being removed. Fig. 4 represents a top view with the casing and the automatic figures removed. Fig. 5 represents a section on line 5 5 of Fig. 4. Fig. 6 represents a section on line 6 6 of Fig. 4. Fig. 7 represents a perspective view of the operating-drum hereinafter referred to. Fig. 8 represents a perspective view of one of the swinging sign-holders. Fig. 9 represents a section on line 9 9 of Fig. 8.

The same reference characters indicate the same parts in all the figures.

In the drawings, $a$ $a$ represent a series of advertising card or sign holders, each having a hub $a'$, mounted to turn on a horizontal rod or stud $a^2$, the stud being supported by brackets $b$ $b$, affixed to the supporting-base $c$. Each holder $a$ is a frame of the construction shown in Figs. 8 and 9, the members of the frame being grooved to receive a card or sign $a^3$. The frame is open at one edge to permit the convenient insertion and removal of the card. To the hub $a'$ of each sign-holder is fixed a short arm $a^4$, which projects in the plane of the holder and is adapted to be acted on by one of a series of actuating-levers $d$. The levers $d$ correspond in number to the sign-holders $a$, and said levers are pivoted side by side upon a horizontal fulcrum rod or bar $d'$, affixed to the brackets $b$. One arm of each lever $d$ projects upwardly from the fulcrum-rod $d'$ and engages the arm $a^4$ of one of the sign-holders, the other arm of the lever projecting downwardly and being arranged to engage one of a series of pins $f$, projecting from a drum $f'$. The pins $f$ correspond in number to the levers $d$ and are spirally arranged, so that as the drum $f'$ is rotated the pins $f$ will successively engage the levers $d$ and move the latter.

The holders $a$ and the cards or signs carried thereby are normally held by gravitation with the holders depressed within a casing or cover $c'$, affixed to the base $c$, said cover having an opening $c^2$, Fig. 2, in its top through which the signs are movable. When a pin $f$ engages one of the levers $d$, the resulting movement of the lever causes the corresponding sign to swing upwardly through the opening $c^2$, the sign being thus exposed above the casing. Each sign when thus exposed is locked for a brief period in its exposed position by means of a locking-dog $g$, Fig. 5, common to all the levers, the lower arm of each lever having an outwardly-projecting finger $d^2$, containing a notch adapted to engage the dog $g$, as shown in Fig. 5. The dog $g$ extends across the series of levers $d$ and is pivoted upon a horizontal rod $g'$, fixed to the bracket $b$. The dog $g$ is normally held down against a fixed stop $g^2$, Fig. 5, by means of a spring $g^3$. The dog $g$ is raised at regular intervals to release the sign last exposed by means of a series of cams $g^4$, Figs. 6 and 7, affixed to the drum $f'$, and an arm $g^5$, Fig. 6, affixed to the dog $g$ and arranged to bear on the portion of the drum occupied by said cams, the arrangement being such that as the drum rotates the arm $g^5$ is first raised by one of the cams $g^4$ and then released by said cam and allowed to drop upon the next cam, these movements of the arm $g^5$ being accompanied by similar upward and downward movements of the dog $g$. At each upward movement of the dog $g$ the lever $d$ engaged thereby is released and the exposed sign is allowed to drop to its concealed position. The downward movement of the sign-holders and signs is arrested by a yielding cushion $c^3$, Fig. 5, supported by the base $c$.

The drum $f'$ is rotated by a suitable motor.

I have shown conventionally in Figs. 3 and 4 an electric motor $h$, the shaft of which is connected by a sprocket-chain $h'$ with a shaft $h^2$, journaled in the supporting-frame. The shaft $h^2$ is connected by a sprocket-chain $h^3$ with a shaft $h^4$, affixed to the drum $f'$.

When the apparatus is in operation, the sign-holders, with their signs, are raised successively, each sign-holder being briefly locked in its raised position and released and allowed to fall back when the next sign has been raised.

To add to the attractiveness of the apparatus or to make it more conspicuous and liable to attract attention, I have provided a series of automatic figures $i\ j\ k$, Fig. 1, to which certain movements are imparted by the operating mechanism actuated by the motor $h$. The figure $i$ is intended to represent a switchman holding a switch-lever $i'$, which is pivoted at $i^2$ to the supporting-frame, its lower arm being connected with an oscillating lever $i^3$ through a rock-shaft $i^4$, having arms $i^5\ i^6$. A rod $i^7$ connects the arm $i^5$ with the lever $i^3$, and a rod $i^8$ connects the arm $i^6$ with the switch-lever $i'$. The oscillating lever $i^3$ is fulcrumed at $i^9$, and one of its arms is normally held down by a spring $i^{10}$, Fig. 1, against the perimeter of a wheel $i^{12}$, having a series of cams $i^{13}$, said wheel being affixed to the shaft $h^4$, which carries the drum $f'$. The spring $i^{10}$ is here shown as attached at one end to the supporting-frame and at the other end to the arm $i^5$, so that the spring acts on the lever $i^3$ through the arm $i^5$ and rod $i^7$. The rotation of the wheel $i^{12}$, together with the stress of the spring $i^{10}$, causes an oscillating movement of the lever $i^3$, which movement is imparted to the switch-lever $i'$ and figure $i$ through the described connections, the mechanism being timed so that the figure $i$ is moved backwardly during the upward movement of each sign, so that apparently the figure moving the lever causes the raising of the sign. The figure $j$ is provided with a movable arm $j'$, having a hammer $j^2$ arranged to strike a gong $j^3$, mounted on the supporting-frame. The arm $j'$ is jointed to the body of the figure $j$ and is connected by a rod $j^4$, Fig. 1, passing downwardly through and below the body of the figure $j$, with a lever $j^5$ fulcrumed at $j^6$. A lever $j^7$, fulcrumed at $j^8$, has one of its ends pivoted at $j^9$ to the lever $j^5$, its other end being held down by a spring $j^{10}$, so as to bear yieldingly upon either one of a series of pins $j^{12}$, projecting laterally from the cams on the wheel $i^{12}$. The rotation of the wheel $i^{12}$ therefore causes the oscillation of the lever $j^7$, the latter oscillating the lever $j^5$ and imparting up-and-down movements to the rod $j^4$. The figure $k$ has a jointed arm $k'$, holding a flag $k^2$. This arm is oscillated to cause the waving of the flag by suitable mechanism, including a cam $k^3$, fixed to a shaft which is geared to the shaft $h^2$, a horizontal lever $k^4$, fulcrumed at $k^5$ and having an arm $k^6$, bearing against the cam $k^3$, and a rod $k^7$, engaged at its lower end with the lever $k^4$ and extended upwardly into the figure $k$, said arm $k^7$ being connected within the figure with the flag-carrying arm $k'$ by any suitable mechanism—such, for instance, as shown in Fig. 1. The heads of the figures $j$ and $k$ are preferably adapted to turn from side to side horizontally, the head of the figure $j$ being mounted on a vertical shaft $j^{14}$, while the head of the figure $k$ is mounted on a vertical shaft $k^9$. The shaft $j^{14}$ is provided with an arm $j^{15}$, which is connected by a rod $j^{16}$ with a crank-arm $j^{17}$, affixed to the shaft carrying the cam $k^3$. The rotation of the cam $k^3$ therefore causes the shaft $j^{14}$ to oscillate, and thus turn the head of the figure $j$. The arm $j^{15}$ is connected by a rod $k^{10}$ with an arm $k^{12}$, affixed to the vertical shaft $k^9$, said rod $k^{10}$ and arm $k^{12}$ imparting oscillating motion from the arm $j^{15}$ to the shaft $k^9$ and to the head of the figure $k$. The figures $i$, $j$, and $k$ are mounted on a platform $c^4$, forming a part of the casing, the platform being below and in front of the main portion $c'$ of the casing, the figures being, therefore, prominently exposed and adapted by their above-described movements to attract attention to the advertising matter.

Behind the series of card or sign holders is an additional sign-holder $m$, affixed to a vertical shaft $m'$, which is journaled in bearings in a bracket $m^2$ and is provided with a bevel-gear $m^3$, meshing with a bevel-gear $m^4$, affixed to a shaft $m^5$. Said shaft is provided with a series of radial arms or pins $m^6$, which are arranged to be encountered by a projection $m^7$ on the sprocket-wheel fixed to the shaft $h^4$. There are four of the pins $m^6$, and they are arranged so that each time the projection $m^7$ encounters one of the pins the shaft $m^5$ will be given a quarter of a complete rotation, the gears $m^4$ and $m^3$ being so proportioned that a quarter-rotation of the shaft $m^5$ imparts a half-rotation to the vertical shaft $m'$ and the sign-holder $m$, fixed thereto. The two sides of the sign-holder $m$ are therefore displayed alternately. This operation of the sign-holder $m$ takes place only after the entire series of sign-holders $a'$ have been raised and released. The pins $f$ and cam $g^4$ on the drum $f'$, which cause the raising and release of the swinging sign-holders $a$, do not extend entirely around the drum, a portion of the drum being destitute of cams and pins, as shown clearly in Fig. 6. The omission of cams and pins from the above-described portion of the drum causes a period of disuse of the pivoted sign-holders $a$, which period occurs while the rotary sign-holder $m$ is being operated, as above described.

I claim—

1. An advertising apparatus comprising a series of pivoted signs arranged side by side and normally held in a concealed position, means for projecting the signs successively from such concealed position, means for locking each sign temporarily in its projected position, and means for releasing each sign to allow its return to its concealed position.

2. An advertising apparatus comprising a series of pivoted signs arranged side by side and normally held in a concealed position, each sign having a projecting arm, an operating drum or cylinder having helically-arranged pins, a series of pivoted levers interposed between said drum and the signs, each lever being arranged to engage one of the pins of the drum and the arm of one of the signs and to impart motion from the drum to a sign, means for locking each lever at the end of the movement imparted to it by the drum, and means for releasing each lever to permit the return of the accompanying sign to its concealed position.

3. An advertising apparatus comprising a series of pivoted signs arranged side by side and normally held in a concealed position, an operating drum or cylinder having helically-arranged pins, a series of cams movable with the drum, a series of pivoted levers interposed between said drum and the signs, each lever having a notched arm, the levers being adapted to impart motion from the pins on the drum to the signs, a locking-dog adapted to engage the notched arm of either lever, and an arm connected with said dog and engaging the said cams to alternately raise and depress the dog.

4. An advertising apparatus comprising a series of pivoted signs arranged side by side and normally held in a concealed position, mechanism for moving the signs on their pivots to project and release them successively, and an automaton connected with said mechanism and actuated thereby simultaneously with each of the signs.

5. An advertising apparatus comprising a series of pivoted signs arranged side by side and normally held in a concealed position, mechanism for moving the signs on their pivots to project and release them successively, a lever such as $i'$ connected with and oscillated by said mechanism, the lever being moved simultaneously with each of the signs, and an automaton connected with said lever and moved thereby.

6. An advertising apparatus comprising a series of pivoted signs arranged side by side and normally held in a concealed position, mechanism for moving the signs on their pivots to project and release them successively, a plurality of automatic figures mounted on the frame of the apparatus, and connections between said figures and the sign projecting and releasing mechanism, whereby the figures are moved simultaneously with the signs.

7. An advertising apparatus comprising a series of pivoted signs arranged side by side and normally held in a concealed position, mechanism for projecting and releasing the signs successively, said mechanism having provisions for periodically discontinuing the operation of the pivoted signs, a rotary sign adjacent to the pivoted signs, and connections between said rotary sign and the said projecting and releasing mechanism, whereby movements are imparted to the rotary sign while the operation of the pivoted signs is discontinued.

In testimony whereof I have affixed my signature in presence of two witnesses.

WILLIAM C. DAY.

Witnesses:
C. F. BROWN,
E. BATCHELDER.